Patented Sept. 28, 1954

2,690,450

UNITED STATES PATENT OFFICE 2,690,450

METHOD FOR PREPARATION OF SULFUR-CONTAINING ESTERS OF PHOSPHORIC ACID

Everett E. Gilbert, Flushing, and Catherine J. McGough, Kew Gardens, N. Y., assignors to Allied Chemical & Dye Corporation, New York, N. Y., a corporation of New York No Drawing. Application March 23, 1951, Serial No. 217,298

12 Claims. (Cl. 260—461)

This invention relates to new sulfur-containing esters of phosphoric acid useful for parasiticidal and other purposes and to the preparation of such compounds.

These new sulfur-containing phosphoric acid esters conform to the general formula

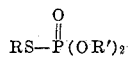

in which R represents an aryl or substituted aryl radical and R' represents an alkyl, substituted alkyl, cycloalkyl, alkenyl, aryl or substituted aryl radical.

In the new compounds, typical examples of R are phenyl, 4-chlorophenyl, 3,4-dichlorophenyl, 4-nitrophenyl, 4-acetylaminophenyl, benzothiazyl and beta-naphthyl. Typical examples of R' are ethyl, butyl, betachloroethyl, methyl, allyl, cyclohexyl, benzyl and cresyl.

A sulfur-containing phosphoric acid ester of the general formula given above may be prepared according to certain aspects of the invention by reacting an organic phosphite of the general formula

in which R' has the meaning shown above, either with an aromatic sulfonyl chloride of the general formula

or with an aromatic sulfenyl chloride of the general formula

in which R has the meaning shown above, and recovering said sulfur-containing phosphoric acid ester.

The reaction between the organic phosphites and the aromatic sulfonyl chlorides takes place in accordance with the following equation:

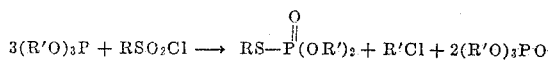

The reaction between the organic phosphites and the aromatic sulfenyl chlorides is represented by the following equation:

The lower trialkyl phosphites such as triethyl, tributyl and tri (betachloroethyl) phosphites are preferred reactants, but other phosphites of the general formula given above, including mixed phosphites containing different alkyl, substituted alkyl, cycloalkyl, alkenyl, aryl or substituted aryl radicals, may be effectively employed.

It is preferred that the organic phosphite and aromatic sulfonyl chloride or aromatic sulfenyl chloride be employed in approximately stoichiometric amounts to prepare the novel sulfur-containing phosphoric acid esters of the invention.

High yields of the desired sulfur-containing esters are obtained by carrying out the reaction in the presence of an inert solvent, preferably one lower boiling than the phosphoric acid ester or esters produced. Suitable inert solvents include ethylene dichloride, ethyl ether, petroleum ether, carbon tetrachloride, toluene and benzene. When reaction is completed, lower boiling solvent so used may be recovered for reuse by simple distillation at atmospheric or lower pressure.

The reaction may be carried out at any temperature up to the decomposition point of the reactants. Generally, however, the reaction is quite vigorous during the addition of the reactants, and cooling is desirable to retard the reaction.

As may be seen from the equation illustrating the reaction of the organic phosphites with the aromatic sulfonyl chlorides, phosphoric acid esters of the general formula

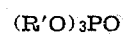

in which R' has the meaning shown above, are produced during the course of the reaction. These phosphoric acid esters are well known articles of commerce finding usage, for example, as solvents or plasticizers. Since heretofore, these esters have not been produced by such a reaction, their preparation constitutes another feature of our invention. The phosphoric acid esters may be separated from other reaction products by any suitable method such as by vacuum distillation usually at a temperature higher than employed for recovery of preferred lower boiling solvent. We have found, however, that these esters, especially lower trialkyl phosphates are satisfactory carriers for the sulfur-containing phosphoric acids having parasiticidal properties. In addition, when they are produced in accordance with the invention by reaction of aromatic sulfonyl chlorides, they are obtained in sufficient quantity that the entire reaction product containing active parasiticidal agent and phosphoric acid ester may be applied as produced and without dilution or modification to the substance to be protected from parasites.

As is apparent from the equation illustrating the reaction of the organic phosphites with aromatic sulfenyl chlorides, phosphoric acid esters are not produced as by-products. Thus when the formation of by-product phosphoric acid esters is not desired, for example, when another carrier for the parasiticidal agent is desired, it may be preferred to produce the agents of this type characteristic of the invention by use of the sulfenyl chloride reaction. When a lower trialkyl phosphite or other phosphite forming a relatively volatile organic chloride is employed in reaction with sulfenyl chloride, recovery of product concentrated in active parasiticidal agent may be effected easily and economically by simple heating or distillation of the reaction mass at a low temperature suitable for driving off such organic chloride and solvent, if present.

The following examples are given for the purpose of illustrating the present invention, but are not intended to be limiting on the scope thereof. Parts are by weight.

Example 1

90 parts of benzenesulfonyl chloride were dissolved in 100 parts of ethylene dichloride. 249 parts of triethyl phosphite were slowly added with stirring over a period of about ½ hour, the temperature being maintained below 15° C. The resulting solution was refluxed for about 2 hours to remove the ethyl chloride formed during the reaction. The solution was then vacuum distilled to remove the ethylene dichloride solvent and triethyl phosphate, 169 parts (93% of theory) of the latter being collected at a temperature of 77° to 80° C. at 6 mm. mercury pressure. The sulfur-containing phosphoric acid ester having the formula

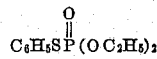

a light yellow liquid distilling at 148° to 155° C. at 6 mm. mercury pressure, constituted 110 parts (90% of theory).

*Analysis.*—Calculated for

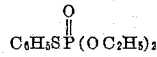

S, 13.0; P, 12.6. Found: S, 12.9; P, 12.6.

In another run an ether solution of benzenesulfonyl chloride was reacted with tributyl phosphite. The ether solvent and the butyl chloride formed during the reaction were removed by heating, leaving a product comprising tributyl phosphate and the sulfur-containing phosphoric acid ester having the formula

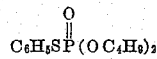

Example 2

420 parts of 1,2,4-trichlorobenzenesulfonyl chloride were dissolved in 250 parts of ethylene dichloride. 747 parts of triethyl phosphite were added dropwise with agitation over a period of about 2½ hours, the temperature being maintained below 20° C. The resulting solution was refluxed for about 2 hours to remove the ethyl chloride formed during the reaction. The solution was then vacuum distilled to remove the ethylene dichloride solvent and triethyl phosphate, 498 parts (92% of theory) of the latter being collected at a temperature of 80° to 90° C. at 8 mm. mercury pressure. After the phosphate was removed, the sulfur-containing phosphoric acid ester having the formula

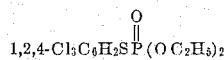

crystallized to a solid upon cooling. It constituted 474 parts (91% of theory).

*Analysis.*—Calculated for

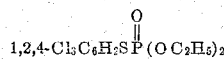

S, 8.9; P, 9.2; Cl, 30.7. Found: S, 8.8; P, 9.3; Cl, 31.1.

Example 3

49.8 parts of triethyl phosphite were dissolved in 50 parts of ether. To this solution 22 parts of 4-chlorobenzenesulfonyl chloride dissolved in 200 parts of ether were slowly added with cooling and agitation. The reaction mixture was then heated on a steam bath for 3 hours to remove the ether solvent and the ethyl chloride formed during the reaction. The product, a tan colored liquid, comprising triethyl phosphate and the sulfur-containing phosphoric acid ester having the formula

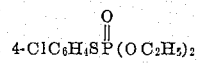

constituted 54 parts (84% of theory).

Example 4

24.6 parts of 3,4-dichlorobenzenesulfonyl chloride dissolved in 25 parts of ether were added dropwise with cooling and agitation to a solution of 49.8 parts of triethyl phosphite in 250 parts of ether. The reaction mixture was then heated on a steam bath for 3 hours to remove the ether solvent and the ethyl chloride formed during the reaction. The product, a straw colored liquid, comprising triethyl phosphate and the sulfur-containing phosphoric acid ester having the formula

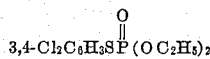

constituted 55 parts (81% of theory).

Example 5

24.6 parts of 2,5-dichlorobenzenesulfonyl chloride dissolved in 25 parts of ether were added dropwise with cooling and stirring to a solution of 49.8 parts of triethyl phosphite in 250 parts of ether. The reaction mixture was then heated on a steam bath for three hours to remove the ether solvent and the ethyl chloride formed during the reaction. The product, a straw colored liquid comprising triethyl phosphate and the sulfur-containing phosphoric acid ester having the formula

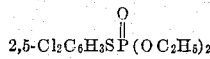

constituted 56.5 parts (83% of theory).

Example 6

25 parts of triethyl phosphite dissolved in 25 parts of ether were slowly added with cooling and stirring to a solution of 11 parts of 4-nitrobenzenesulfonyl chloride in 200 parts of ether. The reaction mixture was then heated on a steam bath for 3 hours to remove the ether solvent and the ethyl chloride formed during the reaction. The product, a heavy orange colored liquid comprising triethyl phosphate and the sulfur-containing phosphoric acid ester having the formula $$4\text{-}NO_2C_6H_4S\overset{O}{\overset{\|}{P}}(OC_2H_5)_2$$

constituted 26 parts (79% of theory).

In another run, a toluene solution of 4-nitrobenzenesulfonyl chloride was reacted with tributyl phosphite. The butyl chloride formed during the reaction and the toluene solvent were removed by heating, leaving a product comprising tributyl phosphate and the sulfur-containing phosphoric acid ester having the formula $$4\text{-}NO_2C_6H_4S\overset{O}{\overset{\|}{P}}(OC_4H_9)_2$$

Example 7

49.8 parts of triethyl phosphite were slowly added with cooling and stirring to 23.4 parts of 4-acetylaminobenzenesulfonyl chloride dissolved in 100 parts of ether. The reaction mixture was then heated on a steam bath for six hours to remove the ether solvent and the ethyl chloride formed during the reaction. The product, an orange colored liquid comprising triethyl phosphate and the sulfur-containing phosphoric acid ester having the formula $$4\text{-}CH_3CONHC_6H_4S\overset{O}{\overset{\|}{P}}(OC_2H_5)_2$$

constituted 52.5 parts (79% of theory).

Example 8

23 parts of beta-naphthalenesulfonyl chloride dissolved in 125 parts of ether were mixed at room temperature with 50 parts of triethyl phosphite also dissolved in 125 parts of ether. A gentle exothermic reaction developed spontaneously. When the temperature began to drop, the reaction mixture was heated on a steam bath for 6 hours to remove the ether solvent and the ethyl chloride formed during the reaction. An oily product comprising triethyl phosphate and the sulfur-containing phosphoric acid ester having the formula $$C_{10}H_7S\overset{O}{\overset{\|}{P}}(OC_2H_5)_2$$

constituted 53 parts (80% of theory).

Several additional runs were carried out demonstrating the production of sulfur-containing phosphoric acid esters by reacting triethyl phosphite with aromatic sulfenyl chlorides, such as benzenesulfenyl chloride, 4-nitrobenzenesulfenyl chloride, 2-nitrobenzenesulfenyl chloride and benzothiazylsulfenyl chloride. Generally, the triethyl phosphite was added slowly to the aromatic sulfenyl chloride in the presence of an inert solvent with cooling and stirring. The ethyl chloride formed during the reaction and the inert solvent were removed by heating, and a product comprising the sulfur-containing phosphoric acid ester but containing no by-product triethyl phosphate was obtained.

Products of the type produced by the invention find valuable application for a number of purposes, including, but without limitation, as insecticides, fungicides or both, and as intermediates for a wide variety of thiophenols, which are obtainable directly by hydrolysis of the novel sulfur-containing phosphoric acid esters characteristic of the invention. Insecticidal and fungicidal properties of certain sulfur-containing phosphoric acid esters typical of those embraced within the scope of this invention are indicated in the following table:

| Sulfur-Containing Phosphoric Acid Ester | Toxicity to Carpet Beetle Larvae | | Mite Control Kill | Fungitoxicity | |
|---|---|---|---|---|---|
| | Kill | Protection | | Brown Rot | Early Blight |
| $4\text{-}ClC_6H_4S\overset{O}{\overset{\|}{P}}(OC_2H_5)_2$ | Percent 100 | Percent 96 | Percent 67 | | |
| $3,4\text{-}Cl_2C_6H_3S\overset{O}{\overset{\|}{P}}(OC_2H_5)_2$ | 100 | 97 | 93 | 67 | 14 |
| $2,4\text{-}Cl_2C_6H_3S\overset{O}{\overset{\|}{P}}(OC_2H_5)_2$ | 100 | 99 | 99 | | |
| $1,2,4\text{-}Cl_3C_6H_2S\overset{O}{\overset{\|}{P}}(OC_2H_5)_2$ | | | | *17 | *15 |
| $4\text{-}NO_2C_6H_4S\overset{O}{\overset{\|}{P}}(OC_2H_5)_2$ | 100 | 99 | 91 | 7 | 1.7 |
| $C_{10}H_7S\overset{O}{\overset{\|}{P}}(OC_2H_5)_2$ | 80 | 96 | | | |
| $4\text{-}CH_3CONHC_6H_4S\overset{O}{\overset{\|}{P}}(OC_2H_5)_2$ | | | | 270 | 60 |

Data given in the above table, except for those marked with an asterisk, were obtained with mixtures of the sulfur-containing phosphoric acid ester and inert triethyl phosphate in ratio of about one mol of the former to two mols of the latter. In the case of the data marked with an asterisk, the tests were in the absence of triethyl phosphate.

The tests on toxicity to carpet beetle larvae (*Attagenus piceus* Oliv.) were run by dipping wool swatches in a 1% acetone solution of the sample, air drying the swatches, and exposing them to the larvae in Petri dishes for 28 days. "Protection" indicates percentage of original weight of wool after exposure.

The mite tests were run on "red spider" (*Tetranycnus bimaculatus*). One pound of 15% wettable spray powder (containing 15% sample and 85% clay) was used per 100 gallons of water spray.

In the tests run on the compounds as fungicides against brown rot (*Sclerotinia fructicola*) and early blight (*Alternaria solani*), data are reported in parts per million of sample required to kill 50% of the fungus spore utilized (which spores are representative economic plant fungi).

We claim:

1. A method of preparing a sulfur-containing phosphoric acid ester of the general formula $$RS-\overset{O}{\underset{\|}{P}}(OR')_2$$

in which R is a member of the group consisting of aryl and substituted aryl radicals and R' is a member of the group consisting of alkyl, substituted alkyl, cycloalkyl, alkenyl, aryl and substituted aryl radicals, which comprises reacting an organic phosphite of the general formula $$(R'O)_3P$$

in which R' is a member of the group consisting of alkyl, substituted alkyl, cycloalkyl, alkenyl, aryl and substituted aryl radicals, with an aromatic sulfonyl chloride of the general formula $$RSO_2Cl$$

in which R is a member of the group consisting of aryl and substituted aryl radicals.

2. A method of preparing a sulfur-containing phosphoric acid ester of the general formula $$RS-\overset{O}{\underset{\|}{P}}(OR')_2$$

in which R is a member of the group consisting of aryl and substituted aryl radicals and R' is a member of the group consisting of alkyl, substituted alkyl, cycloalkyl, alkenyl, aryl and substituted aryl radicals, which includes the step of reacting an organic phosphite of the general formula $$(R'O)_3P$$

in which R' is a member of the group consisting of alkyl, substituted alkyl, cycloalkyl, alkenyl, aryl and substituted aryl radicals, with an organic chloride of the group consisting or aromatic sulfonyl chlorides of the general formula $$RSO_2Cl$$

and aromatic sulfenyl chlorides of the general formula $$RSCl$$

in which R is a member of the group consisting of aryl and substituted aryl radicals.

3. A method of preparing a sulfur-containing phosphoric acid ester of the general formula $$RS-\overset{O}{\underset{\|}{P}}(OR')_2$$

in which R is a member of the group consisting of aryl and substituted aryl radicals and R' is a member of the group consisting of alkyl, substituted alkyl, cycloalkyl, alkenyl, aryl and substituted aryl radicals, which comprises reacting an organic phosphite of the general formula $$(R'O)_3P$$

in which R' is a member of the group consisting of alkyl, substituted alkyl, cycloalkyl, alkenyl, aryl and substituted aryl radicals, with an aromatic sulfonyl chloride of the general formula $$RSO_2Cl$$

in which R is a member of the group consisting of aryl and substituted aryl radicals, and recovering said sulfur-containing phosphoric acid ester from the reaction mixture.

4. The process of claim 3 in which the organic phosphite is reacted with the aromatic sulfonyl chloride in ratio of about 3 mols of organic phosphite to 1 mol of aromatic sulfonyl chloride.

5. The process of claim 4 in which the reaction is carried out in the presence of an inert solvent.

6. A method of preparing a sulfur-containing phosphoric acid ester of the general formula $$RS-\overset{O}{\underset{\|}{P}}(OR')_2$$

in which R is a member of the group consisting of aryl and substituted aryl radicals and R' is a member of the group consisting of alkyl, substituted alkyl, cycloalkyl, alkenyl, aryl and substituted aryl radicals, which comprises reacting an organic phosphite of the general formula $$(R'O)_3P$$

in which R' is a member of the group consisting of alkyl, substituted alkyl, cycloalkyl, alkenyl, aryl and substituted aryl radicals, with an aromatic sulfenyl chloride of the general formula $$RSCl$$

in which R is a member of the group consisting of aryl and substituted aryl radicals, and recovering said sulfur-containing phosphoric acid ester from the reaction mixture.

7. The process of claim 6 in which the organic phosphite is reacted with the aromatic sulfenyl chloride in ratio of about 1 mol of organic phosphite to 1 mol of aromatic sulfenyl chloride.

8. The process of claim 7 in which the reaction is carried out in the presence of an inert solvent.

9. A method of preparing the sulfur-containing phosphoric acid ester having the formula $$4\text{-}NO_2C_6H_4S\overset{O}{\underset{\|}{P}}(OC_2H_5)_2$$

which comprises reacting triethyl phosphite with 4-nitrobenzenesulfonyl chloride in the ratio of about 3 mols of triethyl phosphite to 1 mol of 4-nitrobenzenesulfonyl chloride in the presence of an inert solvent, and recovering said sulfur-containing phosphoric acid ester from the reaction mixture.

10. A method of preparing the sulfur-containing phosphoric acid ester having the formula $$3,4\text{-}Cl_2C_6H_3S\overset{O}{\underset{\|}{P}}(OC_2H_5)_2$$

which comprises reacting triethyl phosphite with 3,4-dichlorobenzenesulfonyl chloride in ratio of about 3 mols of triethylphosphite to 1 mol of 3,4-dichlorobenzenesulfonyl chloride in the presence of an inert solvent, and recovering said sulfur-containing phosphoric acid ester from the reaction mixture.

11. A method of preparing the sulfur-containing phosphoric acid ester having the formula $$4\text{-}NO_2C_6H_4S\overset{O}{\underset{\|}{P}}(OC_2H_5)_2$$

which comprises reacting triethyl phosphite with 4-nitrobenzenesulfenyl chloride in the ratio of about 1 mol of triethyl phosphite to 1 mol of 4-nitrobenzenesulfenyl chloride in the presence of an inert solvent, and recovering said sulfur-containing phosphoric acid ester from the reaction mixture.

12. A method of preparing the sulfur-containing phosphoric acid ester having the formula $$3,4\text{-}Cl_2C_6H_3S\overset{O}{\underset{\|}{P}}(OC_2H_5)_2$$

which comprises reacting triethyl phosphite with 3,4-dichlorobenzenesulfenyl chloride in ratio of about 1 mol of triethyl phosphite to 1 mol of 3,4-dichlorobenzenesulfenyl chloride in the presence of an inert solvent, and recovering said sulfur-containing phosphoric acid ester from the reaction mixture.

References Cited in the file of this patent

UNITED STATES PATENTS

| Number | Name | Date |
|---|---|---|
| 2,494,283 | Cassaday et al. | Jan. 10, 1950 |
| 2,494,284 | Cassaday et al. | Jan. 10, 1950 |
| 2,501,731 | Mertes | Mar. 28, 1950 |
| 2,568,859 | Ladd | Sept. 25, 1951 |

FOREIGN PATENTS

| Number | Country | Date |
|---|---|---|
| 605,268 | Great Britain | July 20, 1948 |

OTHER REFERENCES

E. 605, Manufacturing Chemist & Manufacturing Perfumer, vol. 19, No. 12, pages 548 and 549 (1948).

BIOS–PB 87923–R, pages 33, 53, 57, 59–62, April 23, 1948.